(12) United States Patent
Morellon

(10) Patent No.: US 11,806,556 B2
(45) Date of Patent: Nov. 7, 2023

(54) ARRANGEMENT PROVIDED WITH AN EMERGENCY EVACUATION SYSTEM

(71) Applicant: AIRBUS HELICOPTERS, Marignane (FR)

(72) Inventor: Emeric Morellon, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 30 days.

(21) Appl. No.: 17/723,021

(22) Filed: Apr. 18, 2022

(65) Prior Publication Data

US 2022/0387827 A1 Dec. 8, 2022

(30) Foreign Application Priority Data

Jun. 3, 2021 (FR) ..................................... 2105837

(51) Int. Cl.
*B64D 25/08* (2006.01)
*A62B 1/16* (2006.01)
*B64C 1/32* (2006.01)

(52) U.S. Cl.
CPC ............... *A62B 1/16* (2013.01); *B64C 1/32* (2013.01); *B64D 25/08* (2013.01)

(58) Field of Classification Search
CPC .. B64D 25/08; B64C 1/32; A62B 1/16; A62B 1/18
See application file for complete search history.

(56) References Cited

U.S. PATENT DOCUMENTS

2018/0057178 A1* 3/2018 Devitt .................... B64D 47/02
2019/0118006 A1* 4/2019 Leachman ............. B64D 47/02

FOREIGN PATENT DOCUMENTS

| CN | 114984474 A | * | 9/2022 |
| EP | 3473546 A1 | | 4/2019 |
| JP | S5961042 U | | 4/1984 |
| JP | H10127798 A | | 5/1998 |
| KR | 20050000045 A | | 1/2005 |

OTHER PUBLICATIONS

Bright: "Boeing 737 300/500 aircraft Flight Deck Sliding Window". Youtube. Apr. 15, 2015 (Apr. 15, 2015). p. 1. https://www.youtube.com/watch?v=TrL-9_Vngck.
French Search Report for French Application No. FR2105837, Completed by the French Patent Office, dated Feb. 3, 2022, 8 pages.

* cited by examiner

*Primary Examiner* — Richard G Davis
(74) *Attorney, Agent, or Firm* — BROOKS KUSHMAN P.C.

(57) ABSTRACT

An arrangement provided with a partition at least partially delimiting an emergency exit, the arrangement having a movable panel that closes the emergency exit in an inactive operating mode, the arrangement comprising an evacuation system provided with a lifeline. The lifeline comprises a deployment section passing through a passage in the partition and secured to a handle, the panel together with the partition delimiting a recess in which the handle is arranged in the inactive operating mode.

16 Claims, 5 Drawing Sheets

ARRANGEMENT PROVIDED WITH AN EMERGENCY EVACUATION SYSTEM

CROSS REFERENCE TO RELATED APPLICATIONS

This application claims priority to French patent application No. FR 21 05837 filed on Jun. 3, 2021, the disclosure of which is incorporated in its entirety by reference herein.

TECHNICAL FIELD

The present disclosure relates to an arrangement provided with an emergency evacuation system.

BACKGROUND

Such an arrangement may be arranged in multiple systems, possibly in a building or indeed a vehicle.

For example, a vehicle, and in particular an aircraft, may comprise one or more emergency evacuation systems for evacuating the individuals present in this vehicle, if necessary. These individuals may be passengers or crew members. Such emergency evacuation systems may include emergency exits.

However, an aircraft may have relatively large dimensions. When this aircraft is on the ground, an emergency exit may be located at a significant height. The aircraft may therefore include a lifeline to help evacuate the individuals to the ground. The term "lifeline" refers to an elongate member that an individual can take hold of, such as a rope or a strip, for example. In particular, such a system may be mandatory under certain certification regulations. The regulation referred to as "CS-29" includes a paragraph stipulating the provision of a lifeline in rotorcraft with 30 passengers or fewer than 30 passengers whose emergency exits are located at a significant height.

Typically, a lifeline may be stored in a recess of the aircraft. In order to exit the aircraft, an individual can take hold of the lifeline and deploy it by attaching it to the aircraft. Though effective, this system requires the lifeline to be taken hold of and correctly attached during a time of stress.

Furthermore, the location of the lifeline may possibly be problematic. When the lifeline is located in a cabin, if an individual forgets it when heading for the emergency exit, he or she will then need to return to the cabin to take this lifeline, if he or she wishes to use it.

A video posted at the URL "https://www.youtube.com/watch?v=TrL-9_Vngck" shows a compartment closed by a shutter and housing a lifeline.

Similarly, document EP 3 473 546 A1 discloses a compartment closed by a shutter in a passenger compartment.

Document JP S59 61042 U discloses a rope attached to a door.

Document KR 2005 0000045 A describes a system provided with a support, an arm and a rope.

Document JP H10 127798 A describes a system for slowing down a fall.

Document US 2019/0118006 describes a vehicle provided with a housing that can be attached in a cabin, close to a seat. The housing contains a fluorescent cable that is securely attached to the vehicle, permanently or semi-permanently. In addition, the housing contains a light source that illuminates the cable.

SUMMARY

An object of the present disclosure is therefore to propose an arrangement having an innovative evacuation system that aims to facilitate descent from a structure during evacuation, and aims to prevent excessive stress from being applied to the lifeline outside an evacuation phase. Such a system can be used in a vehicle but also in other circumstances, for example in a building.

Such an arrangement is provided with a partition at least partially delimiting an emergency exit, said arrangement having a movable panel that closes said emergency exit in an inactive operating mode, said arrangement comprising an evacuation system provided with a lifeline.

In addition, the lifeline comprises a deployment section passing through a passage in the partition and secured to a handle, said panel together with the partition delimiting a recess in which said handle is arranged in the inactive operating mode.

For example, the partition is located above the emergency exit when the arrangement is on the ground and in the inactive operating mode.

The expression "emergency exit" refers to an opening through which an individual can escape.

Therefore, during the inactive operating mode, the handle is arranged in the recess. The handle is at least partially hidden from the individual's view. For example, the handle is completely invisible from outside the recess. There is therefore no risk of the handle being inadvertently actuated. The deployment section is thus only accessible in an emergency operating mode.

During this emergency operating mode, the panel can be moved in a conventional manner in order to open the emergency exit. The handle becomes accessible. The lifeline is thus located exactly at the emergency exit. An individual can manually pull the handle of the deployment section in order to pull the lifeline and deploy it. This individual can then exit through the emergency exit with the help of the lifeline.

This arrangement can therefore make it possible to arrange a lifeline in a secure manner in the immediate proximity of an emergency exit. This arrangement helps ensure that an individual positioned at the emergency exit can easily use the lifeline, once the emergency exit has been deployed. The individual may also manually deploy the lifeline, resulting in a robust system.

Furthermore, the deployment of the lifeline is effectively separate from the opening of the emergency exit. The lifeline is therefore not automatically deployed when the emergency exit is opened. Consequently, if the lifeline is not necessary, the disclosure makes it possible to avoid having a lifeline unnecessarily hindering passage.

This arrangement may further comprise one or more of the following features, taken individually or in combination.

According to one possibility, at least one space may separate said deployment section and the handle from said panel, said space preventing said deployment section and the handle from touching said panel.

Such a space helps prevent interference between the panel and the deployment section and the handle. This space may be dimensioned such that the deployment section and the handle do not come into contact with the panel when the panel is moved. There is therefore no risk of damage to the evacuation system when the panel is moved.

According to one possibility compatible with the preceding possibilities, the evacuation system may comprise a housing, said lifeline comprising a section to be deployed extended by the deployment section, said section to be deployed being arranged in the housing in the inactive operating mode, said partition being interposed between said housing and said emergency exit.

The housing may be attached in a conventional manner to a structure of the arrangement in order to be immobilized. For example, the housing is screwed or riveted to a structural frame.

The section to be deployed is then arranged in the housing, and a proximal end region of this section to be deployed may be attached to the housing in a conventional manner. Furthermore, the deployment section extends outside the housing and passes through the passage in the partition into the recess.

Optionally, the section to be deployed may be folded.

The section to be deployed may be wound around itself in said housing, said assembly possibly comprising a reversible anti-unwinding system that keeps said section to be deployed wound around itself in the inactive operating mode.

The term "reversible" means that the anti-unwinding system does not hinder the lifeline when it is extracted from the housing in the emergency operating mode.

This winding and the anti-unwinding system allow the lifeline to be deployed only during the emergency operating mode when actuated by an individual.

Moreover, a small, lightweight housing may contain a long lifeline. By way of illustration, an assembly weighing approximately 500 grams may comprise a lifeline approximately 3 meters long in a housing.

According to one possibility compatible with the preceding possibilities, the lifeline may be retained directly by a structure of the arrangement or indirectly by the housing. For example, the section to be deployed comprises a loop traversed by a rod secured to the housing or indeed another member of the assembly.

According to one example, the anti-unwinding system is provided with two self-gripping immobilizing fasteners secured to the section to be deployed and engaged with each other in the inactive operating mode.

The term "self-gripping" refers, in this instance and hereafter, to an attachment system having two members that can be attached to each other without a third member, by engaging with each other.

According to one example, a self-gripping system may comprise a member with loops cooperating with a member with hooks. Thus, one fastener may include loops and the other fastener may include hooks, or vice versa.

According to another example, a self-gripping system may comprise two members provided with mushroom-shaped studs and marketed under the brand name Dual Lock®, for example. The mushroom-shaped studs are interlocked with each other by pressing the two members against each other.

The section to be deployed is therefore fastened to itself by means of the two immobilizing fasteners. The anti-unwinding system thus helps keep the lifeline in the housing when not in use. When an individual pulls the handle, the two fasteners disengage from each other, allowing the lifeline to be deployed.

According to another aspect, the deployment section may include an initial section secured to the section to be deployed, the initial section being provided with a self-gripping retaining fastener configured to engage with a complementary self-gripping support fastener secured to said housing. The deployment section may be held to the housing by means of a plurality of self-gripping fasteners in order to prevent the lifeline from rubbing against the external environment as it emerges out of the housing. The self-gripping retaining fastener may then allow the deployment section to be attached temporarily to the housing. By pulling on the deployment section, an individual can then detach the self-gripping retaining fastener from the self-gripping support fastener in order to deploy the lifeline.

According to one possibility compatible with the preceding possibilities, the section to be deployed may be attached to a plurality of grips.

At least locally, the lifeline may include grips to assist an individual.

In order to reduce the space requirement of the lifeline, it is possible to position grips only in the areas deemed most useful. For example, in an aircraft, the section to be deployed may include grips in a region which, during the emergency operating mode, is likely to be located between a side of the aircraft and the lower section of the fuselage of the aircraft.

For example, a grip may be in the form of a piece of leather or rubber, or indeed a loop.

Said grips may optionally be arranged alternately on either side of a strip of said lifeline.

The grips are thus distributed along two sides of the section to be deployed, and thus of the lifeline.

According to one possibility compatible with the preceding possibilities, the lifeline may be made from a durable material having good mechanical properties, as well as good resistance to ageing and to variations in temperature and humidity, for example polyester. Such a lifeline has minimal risks of tearing and good resistance to moisture, heat and time. The material constituting the lifeline may thus be different from the material of any grips that are provided.

According to one possibility compatible with the preceding possibilities, the handle may be formed by means of a gripping member, for example a ring, attached to the deployment section in a conventional manner.

Alternatively, said deployment section may be extended by a final section of the lifeline folded on itself in order to form said handle, said final section comprising, at the handle, successively, a start section, then an intermediate section, followed by an end section, the end section being attached to the start section.

The lifeline as such can therefore easily form a handle that can be taken hold of by an individual in order to be deployed.

According to one possibility compatible with the preceding possibilities, said arrangement may comprise a sheath surrounding said intermediate section.

This sheath may make it easier to take hold of the lifeline.

According to one possibility compatible with the preceding possibilities, said arrangement may comprise a ballast, which may be secured to said deployment section or to the final section.

The ballast can facilitate the deployment of the lifeline.

Optionally, the ballast is attached to the intermediate section.

According to one possibility compatible with the preceding possibilities, said deployment section or the handle may comprise a self-gripping attachment configured to engage with a complementary self-gripping resting fastener secured to said partition, said resting fastener being arranged facing said emergency exit.

The self-gripping attachment may include loops and the resting fastener may include hooks, or vice versa, or mushroom-shaped studs or the like.

The self-gripping attachment may then allow the deployment section or the handle to be temporarily fastened to the partition and held in the recess. By pulling on the deployment section, an individual can then detach the self-gripping attachment from the self-gripping resting fastener in order to deploy the lifeline.

Provided with the abovementioned anti-unwinding system, the assembly is robust, comprising two separate attachment devices. The two attachment devices may use two different technologies, for example one using hook-and-loop technology and the other using mushroom-shaped stud technology.

The self-gripping attachment may optionally be arranged, where appropriate, on said start section.

Such an arrangement may be arranged on multiple supports, for example in order to form a window of a building provided with an evacuation system.

According to one possibility, a vehicle may comprise at least one arrangement.

Such a vehicle may be a land vehicle such as a train, for example, a sea vehicle or an aircraft.

According to one possibility, the vehicle may comprise two arrangements arranged on either side of a cabin, for example arranged on two different sides of the vehicle.

If the vehicle is lying on one side following a crash, at least one arrangement can always be accessed.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
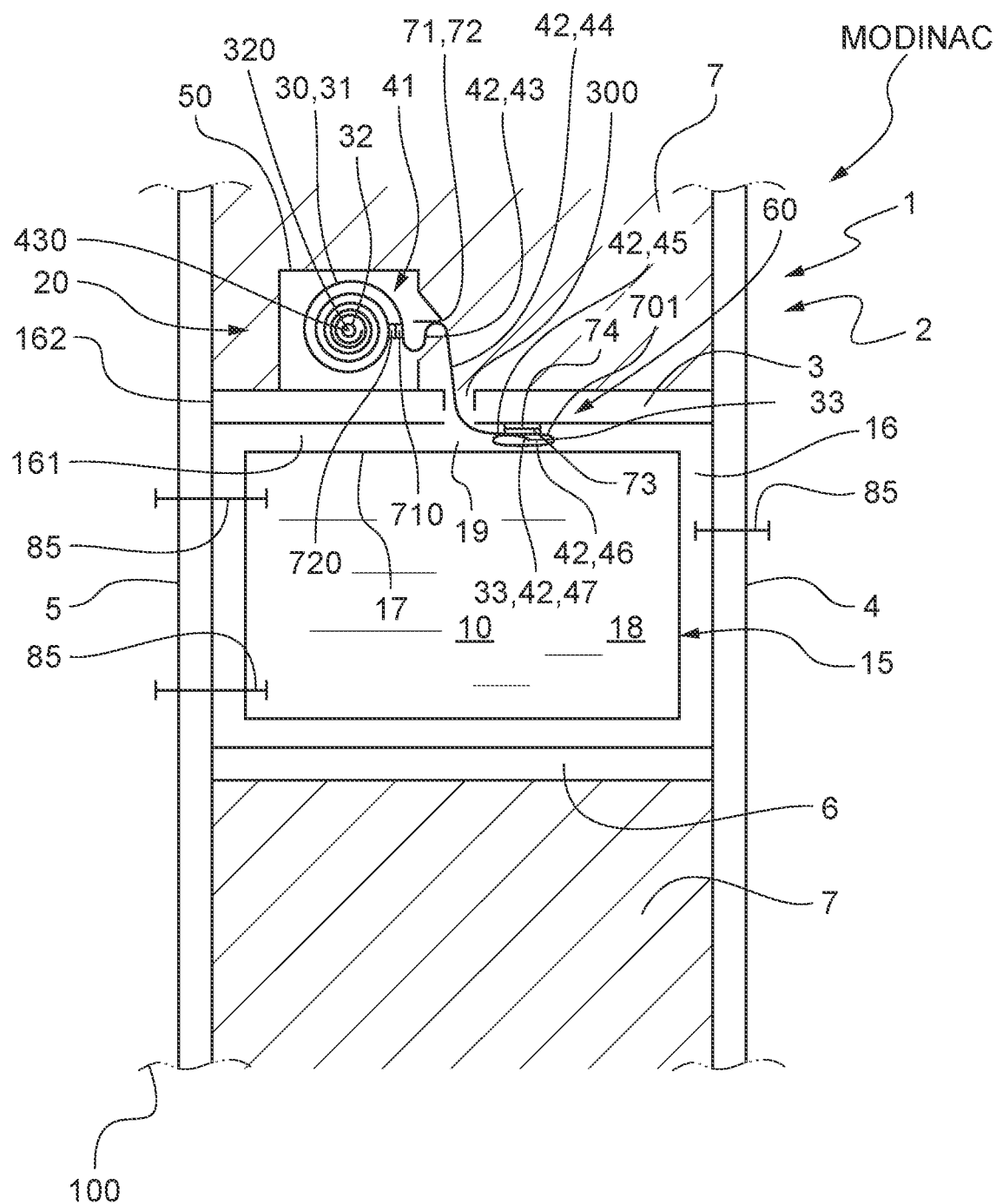
FIG. 1 is a diagram showing an arrangement according to the disclosure.

FIG. 1 shows an arrangement 1 according to the disclosure. This arrangement 1 may be installed in various systems and, for example, in a building or a vehicle.

The arrangement 1 comprises a structure 2 delimiting an emergency exit 10. This structure 2 comprises, in particular, a partition 3 at least partially delimiting the emergency exit 10. The partition 3 may be situated above the emergency exit 10 when the arrangement 1 and, where applicable, the vehicle, is on the ground 100.

By way of illustration, the emergency exit 10 may be arranged laterally between two frames 4, 5 in a first direction, and in a second direction between the partition 3 and a separation 6. Optionally, the arrangement 1 may include coverings 7 around the emergency exit 10. Optionally, the structure 2 may include a support, such as a plate secured to the partition 3.

Furthermore, the arrangement 1 comprises a movable panel 15. This panel 15 comprises a border 16 attached to the structure 2 by conventional reversible attachment devices 85. Such devices 85 comprise, by way of example, pins that each penetrate a hole in the border 16 of the panel 15 and a hole in the structure 2, each pin being secured to a cable capable of pulling the respective pin out of at least one of said holes.

In the inactive operating mode MODINAC shown in FIG. 1, the panel 15 closes the emergency exit 10. The panel 15 therefore prevents an individual from passing through the emergency exit 10. In an emergency operating mode, the panel 15 is moved, or indeed completely removed from the structure 2. The emergency exit 10 is no longer closed, and an individual can pass through this emergency exit 10.

The border 16 may be part of a wall 18 or may be secured to a wall 18. Optionally, the wall 18 is at least partially transparent or translucent in the context of a porthole or a window.

Furthermore, the border 16 and the partition 3 together delimit a recess 19.

For example, the border 16 comprises two sides 161, 162 connected by a bottom 17. The sides 161, 162 may be substantially parallel to one another and substantially orthogonal to the bottom 17. The border 16 is then U-shaped with respect to the partition 3. The bottom 17 may be substantially parallel to the partition 3. The recess 19 may have a substantially parallelepiped external shape. The reverse is also possible, the partition having a U-shaped profile facing one face of the panel. According to another example, the partition and the border may each have complementary L-shaped profiles.

Irrespective of these aspects, the arrangement 1 comprises an evacuation system 20 provided with a lifeline 30. The lifeline 30 comprises an elongate element 31 that extends from a proximal end region 32 to a distal end 33. For example, this elongate element 31 comprises a strip, a strap or a rope and/or is made from polyester.

For example, the lifeline 30 comprises a section 41 to be deployed provided with the proximal end region 32. The section 41 to be deployed is housed in a housing 50 secured to the structure 2, for example secured to the partition 3 or to a support close to the partition 3.

Furthermore, the lifeline 30 comprises a deployment section 42, possibly provided with the distal end 33 that, if applicable, extends the section 41 to be deployed. The lifeline 30 then passes, if applicable, through an opening in the housing 50, the section 41 to be deployed being in the housing 50 while the deployment section 42 is outside the housing 50 in the inactive operating mode MODINAC.

Optionally, the section 41 to be deployed may be retained by a member in order to be attached to the structure 2 at all times. For example, the section 41 to be deployed is retained directly by the structure 2 or indirectly via the housing 50. According to one possibility, the proximal end region 32 may form, for example by stitching, bonding or the like, a loop 320 traversed by a rod 430 of the housing. The section 41 to be deployed is then able to rotate about this rod 430 in order to be unwound.

Furthermore, the deployment section 42 passes through a passage 300 in the partition 3 into the recess 19 in the inactive operating mode MODINAC. In the recess 19, the deployment section 42 is secured to a handle 60 that is effectively inaccessible in the inactive operating mode MODINAC. The partition 3 is therefore positioned between the housing 50 and the emergency exit 10.

Figure 2:
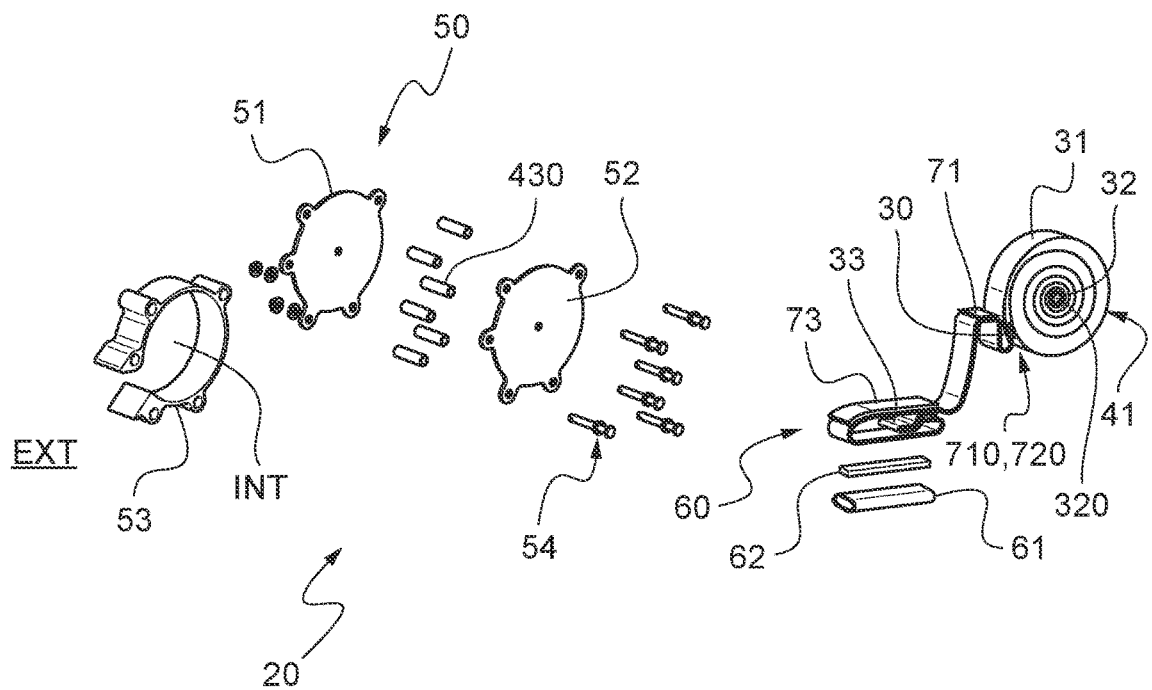
FIG. 2 is an exploded view of an evacuation system.
Figure 3:
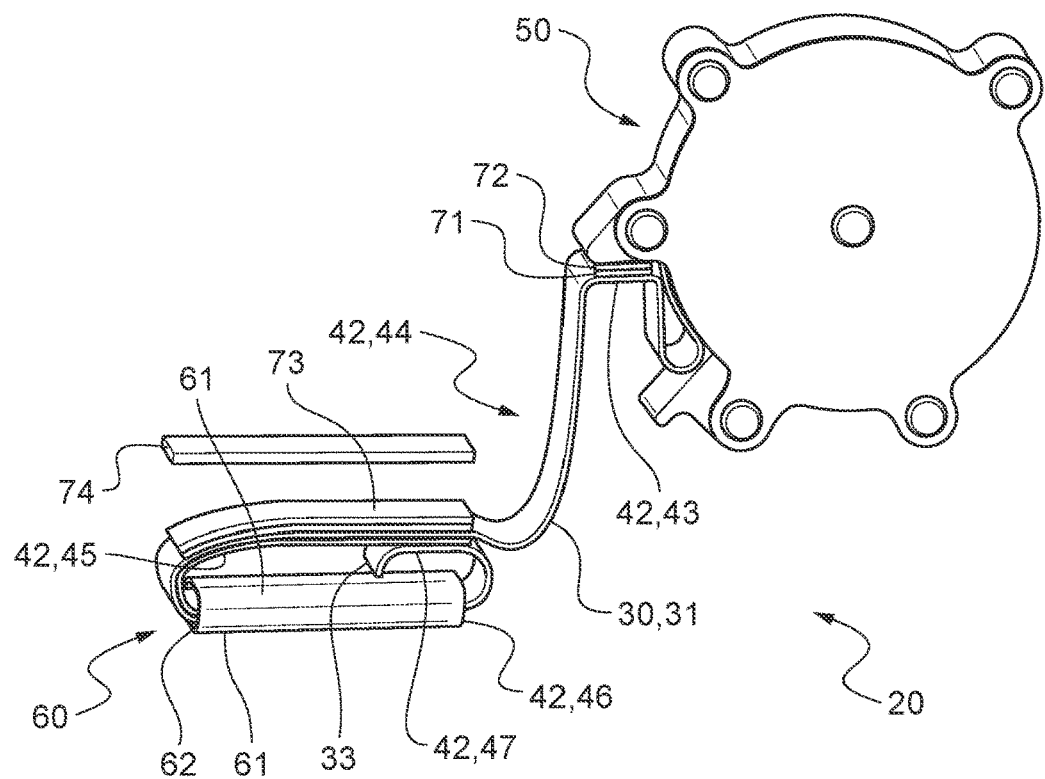
FIG. 3 is a three-dimensional view of the evacuation system shown in FIG. 2.

FIGS. 2 and 3 show an evacuation system 20 in an exploded view and in a three-dimensional view respectively.

With reference to FIG. 2, the housing 50 may, for example, comprise two plates 51, 52 arranged on either side of a discontinuous wall 53. The plates 51, 52 and the discontinuous wall 53 may be traversed by conventional attachment means 54, such as screws, rivets or the like. The wall 53 is discontinuous because it has an opening that brings an internal space INT of the housing 50 into communication with an external environment EXT.

Optionally, the section 41 to be deployed is wound around itself in the housing 50 in the inactive operating mode MODINAC. Optionally, the proximal end region 32 is attached to the housing 50 by conventional means. As indicated above, the proximal end region 32 can form a loop 320 around an attachment means 54 and, for example, around a hollow rod 430 through which a screw or a rivet passes.

Irrespective of these features, the deployment section 42 successively comprises an initial section 43 that is secured to the section 41 to be deployed and a connecting section 44 secured to a handle 60.

A conventional handle can thus be attached to the deployment section 42.

Alternatively, and according to the figures, and in particular FIG. 3, a final section of the lifeline extends the deployment section 42 and forms the handle 60. This final section then comprises, successively, a start section 45 secured to the connecting section 44, an intermediate section 46 and an end section 47 comprising the distal end 33. The final section may be partially folded back on itself in order to form the handle 60. For example, the final section is folded substantially 180 degrees after the start section 45, then substantially 180 degrees after the intermediate section 46, so that the end section 47 is attached to the start section 45, for example by stitching, welding and/or bonding.

According to another feature, the arrangement 1 may comprise a sheath 61 surrounding said intermediate section 46.

According to another feature, the arrangement 1 may include a ballast 62 secured to the deployment section 42, or indeed to the handle 60. For example, the ballast 62 is attached to the intermediate section 46 or to the sheath in a conventional manner, for example by bonding, stitching or the like. If required, the ballast 62 may be arranged in the sheath 61.

According to another optional feature shown in FIGS. 1, 2 and 3, the deployment section 42 may be provided with a holding system in order to prevent it from rubbing against external elements during the inactive operating mode MODINAC.

For example, the initial section 43 may be secured to a self-gripping retaining fastener 71. For example, the retaining fastener 71 is attached to the initial section 43 by stitching, bonding or the like. This retaining fastener 71 can cooperate with a support fastener 72 of the housing. In the inactive operating mode MODINAC, the retaining fastener 71 is engaged with the support fastener 72.

According to the example shown in FIG. 3, a self-gripping support fastener 72, complementary to the retaining fastener 71, is secured to said housing 50. In the inactive operating mode MODINAC, the retaining fastener 71 is engaged with the support fastener 72. Optionally, the initial section 43 is slack between the housing 50 and the retaining fastener 71.

According to another aspect, the assembly may include a system for preventing the lifeline from unwinding in an unwanted manner.

Figure 4:
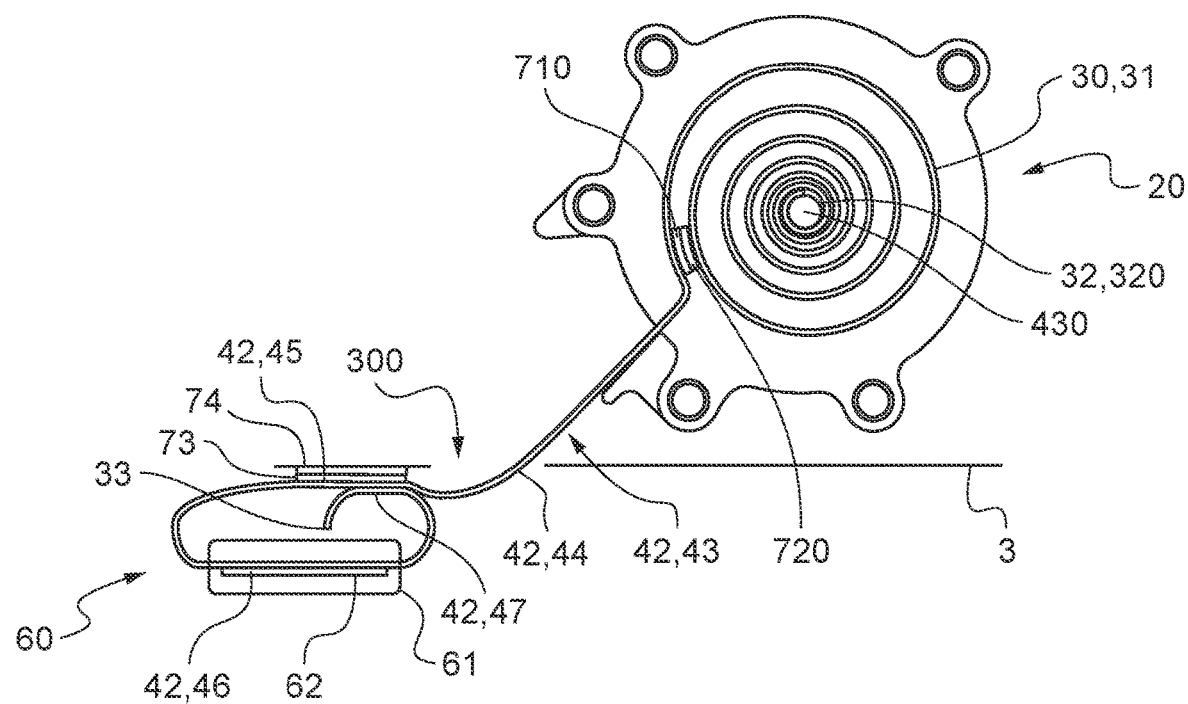
FIG. 4 is a diagram showing an evacuation system in the inactive operating mode.

With reference to FIG. 4, the assembly may therefore comprise a reversible anti-unwinding system for keeping the section 41 to be deployed in the housing during the inactive operating mode MODINAC.

For example, the anti-unwinding system is provided with two self-gripping immobilizing fasteners 710, 720 each secured to the section 41 to be deployed. The two immobilizing fasteners 710, 720 are engaged with each other in the inactive operating mode MODINAC.

Additionally, or alternatively, the deployment section 42, or indeed the handle 60, may comprise a self-gripping attachment 73 configured to be engaged with the structure 2. For example, the self-gripping attachment 73 is arranged on the start section 45, if applicable, being attached thereto by stitching, bonding or the like.

With reference to FIG. 4, a self-gripping resting fastener 74, complementary to the attachment 73, may be attached to the partition 3, facing the emergency exit 10.

A double fastening system can thus attach the lifeline respectively above the partition 3 and at the handle 60 in the recess 19.

Figure 5:
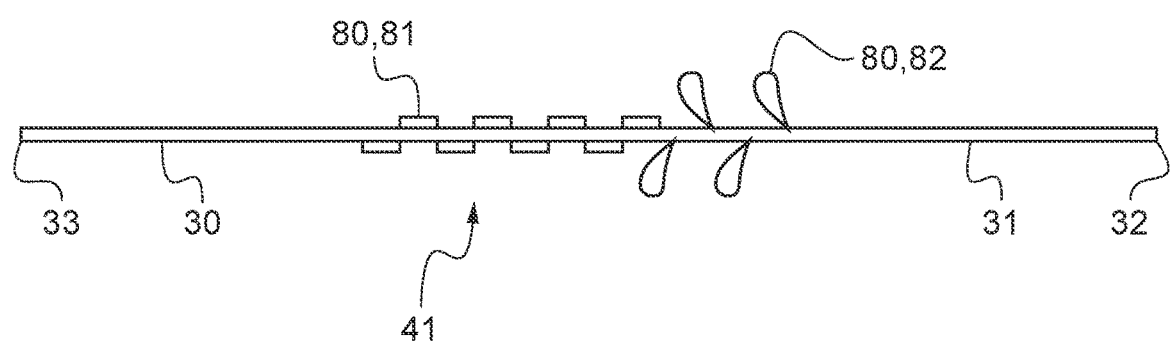
FIG. 5 is a diagram showing a lifeline provided with grips.

According to another feature and in reference to FIG. 5, the section 41 to be deployed may carry a plurality of grips 80 attached to the lifeline by stitching, bonding or the like. These grips 80 may comprise pieces 81 referred to as "patches" and/or loops 82, for example. The grips 80 may be arranged alternately on either side of a strip 31 of the lifeline 30.

Figure 6:
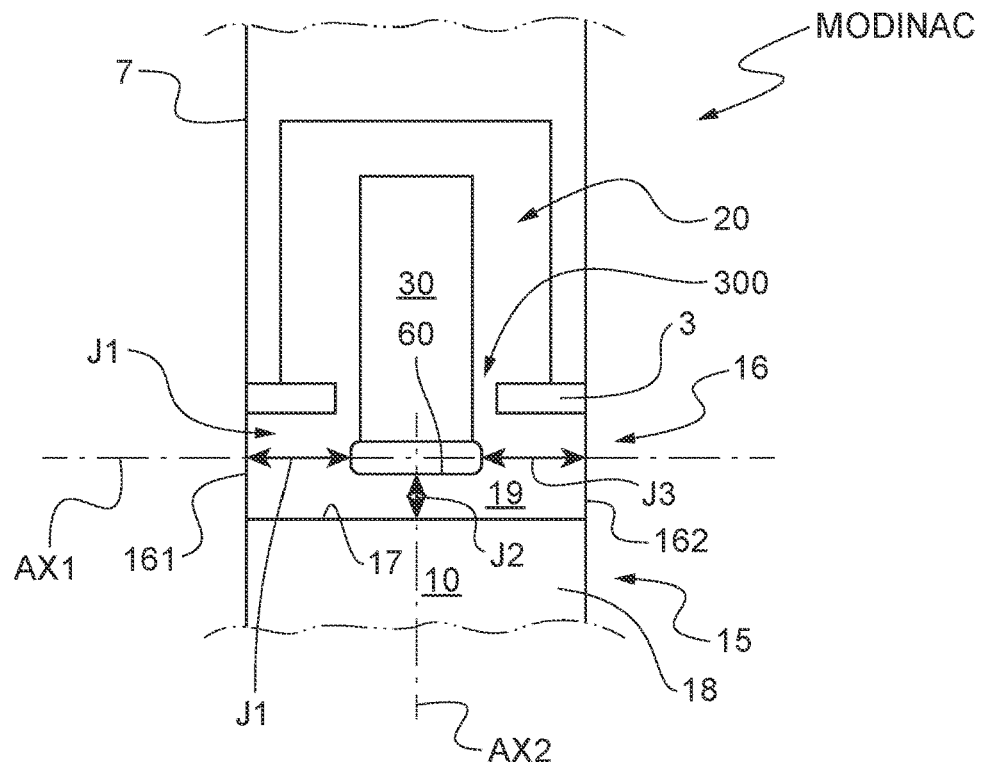
FIG. 6 is a local cross-section of an arrangement in the inactive operating mode.

FIG. 6 shows an assembly 1 according to the disclosure in the inactive operating mode MODINAC. At least one space may separate the handle 60 and the deployment section from the walls 161, 162, 17 of the panel 15 and indeed from the partition delimiting the recess 19. For example, two lateral spaces J1 and J3 separate, along a first axis AX1, the handle 60 and, respectively, the first side 161 and the second side 162, and a vertical space J2 separates the handle 60 and the bottom 17, along a second axis AX2 orthogonal to the first axis AX1.

Figure 7:
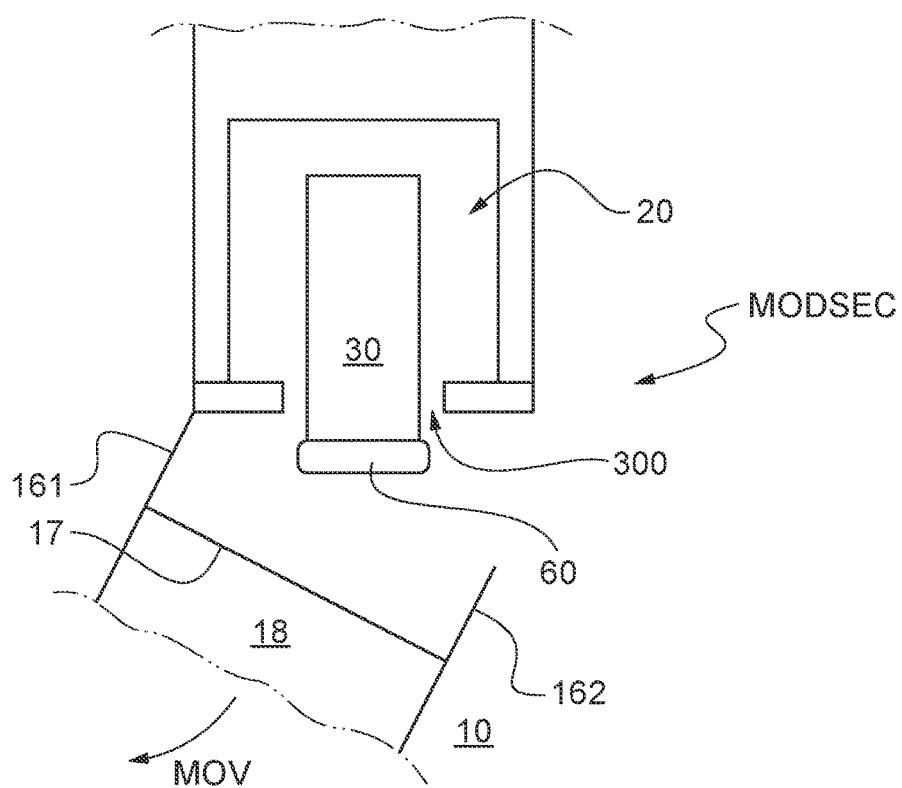
FIG. 7 is a local cross-sectional view of an arrangement in the emergency operating mode.

During the emergency operating mode MODSEC shown in FIG. 7, an individual maneuvers the panel 15. This panel 15 is removed with a rotational and/or translational movement MOV. The various spaces, if provided, make it possible to prevent contact between the panel 15 and the handle 60. The individual can take hold of the handle 60 in order to deploy the lifeline 30. The lifeline 30 can also be retained via its proximal end region by the structure 2 or indeed the housing 50.

Figure 8:
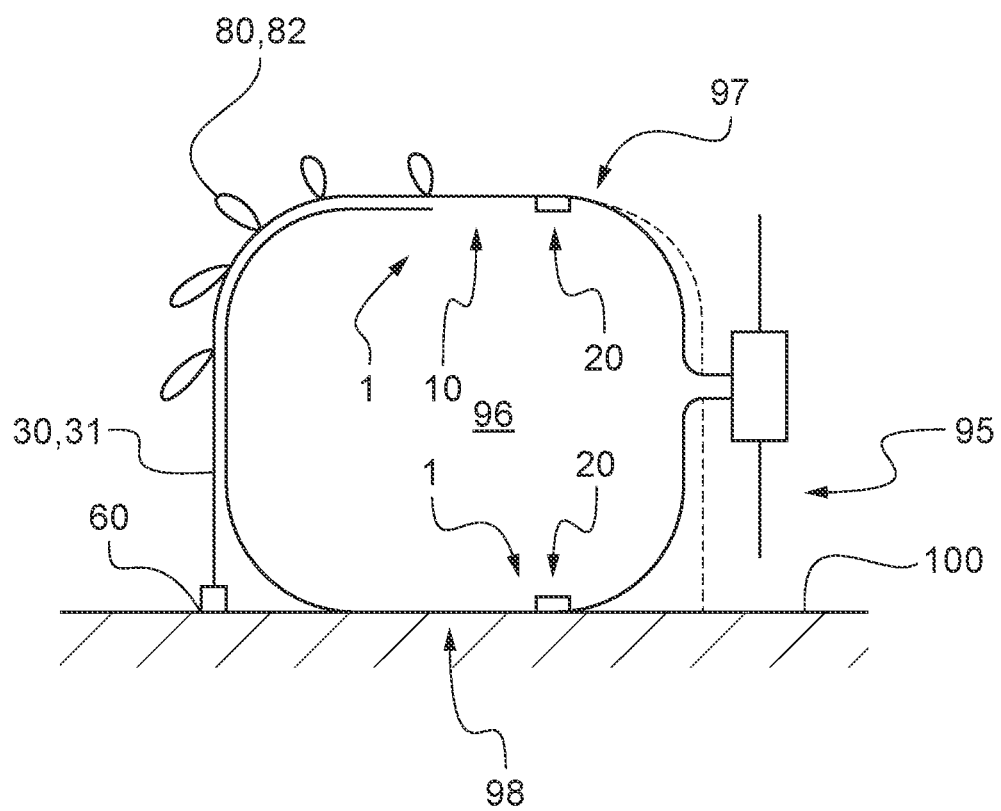
FIG. 8 is a diagram showing a lifeline deployed in an emergency operating mode.

According to FIG. 8, such an arrangement 1 may be arranged on a vehicle 95, for example an aircraft. For example, two arrangements 1 are arranged on either side of a cabin 96 in order to ensure an arrangement 1 is available even when the vehicle is lying on one side. In particular, one arrangement 1 is situated on a first side 97 of the vehicle and another arrangement 1 is situated on a second side 98 of the vehicle 95.

Each lifeline 30 may be dimensioned to reach the ground 100 according to both the position shown by a continuous line and the position shown by a dashed line. Alternatively, a lifeline 30 may be dimensioned to approach the ground without touching it and allow a human to safely reach the ground.

Furthermore, it should be noted that, if required, the lifeline 30 may carry grips 80 only in useful areas.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. An arrangement provided with a partition at least partially delimiting an emergency exit, the arrangement having a movable panel that closes the emergency exit in an inactive operating mode, the arrangement comprising an evacuation system provided with a lifeline,
wherein the lifeline comprises a deployment section passing through a passage in the partition and secured to a handle, the panel together with the partition delimiting a recess in which the handle is arranged in the inactive operating mode.

2. The arrangement according to claim 1,
wherein at least one space separates the deployment section and the handle from the panel, the space preventing the deployment section and the handle from touching the panel.

3. The arrangement according to claim 1,
wherein the evacuation system comprises a housing, the lifeline comprising a section to be deployed extended by the deployment section, the section to be deployed being arranged in the housing in the inactive operating mode, the partition being interposed between the housing and the emergency exit.

4. The arrangement according to claim 3,
wherein the section to be deployed is wound around itself in the housing, the assembly comprising a reversible anti-unwinding system that keeps the section to be deployed wound around itself in the inactive operating mode.

5. The arrangement according to claim 4,
wherein the anti-unwinding system is provided with two self-gripping immobilizing fasteners secured to the section to be deployed and engaged with each other in the inactive operating mode.

6. The arrangement according to claim 3,
wherein the deployment section includes an initial section secured to the section to be deployed, the initial section being provided with a self-gripping retaining fastener configured to be engaged with a complementary self-gripping support fastener secured to the housing.

7. The arrangement according to claim 3,
wherein the section to be deployed is connected to a plurality of grips.

8. The arrangement according to claim 7,
wherein the grips are arranged alternately on either side of a strip of the lifeline.

9. The arrangement according to claim 1,
wherein the deployment section is extended by a final section of the lifeline folded on itself to form the handle, the final section comprising, at the handle, successively, a start section, then an intermediate section, followed by an end section, the end section being attached to the start section.

10. The arrangement according to claim 9,
wherein the arrangement comprises a sheath surrounding the intermediate section.

11. The arrangement according to claim 9,
wherein the arrangement comprises a ballast and wherein the ballast is attached to the intermediate section.

12. The arrangement according to claim 9,
wherein the deployment section or the handle comprises a self-gripping attachment configured to engage with a complementary self-gripping resting fastener secured to the partition, the resting fastener facing the emergency exit and wherein the self-gripping attachment is arranged on the start section.

13. The arrangement according to claim 1,
wherein the arrangement comprises a ballast.

14. The arrangement according to claim 1,
wherein the deployment section or the handle comprises a self-gripping attachment configured to engage with a complementary self-gripping resting fastener secured to the partition, the resting fastener facing the emergency exit.

15. A vehicle,
wherein the vehicle comprises at least one arrangement according to claim 1.

16. The vehicle according to claim 15,
wherein the vehicle comprises two arrangements on either side of a cabin.

* * * * *